(12) United States Patent
Sallas et al.

(10) Patent No.: US 6,381,544 B1
(45) Date of Patent: Apr. 30, 2002

(54) DETERMINISTIC CANCELLATION OF AIR-COUPLED NOISE PRODUCED BY SURFACE SEIMIC SOURCES

(75) Inventors: John J. Sallas, Plano; Rainer Moerig, Houston, both of TX (US)

(73) Assignee: WesternGeco, L.L.C., Houston, TX (US)

( * ) Notice: Subject to any disclaimer, the term of this patent is extended or adjusted under 35 U.S.C. 154(b) by 33 days.

(21) Appl. No.: 09/619,326

(22) Filed: Jul. 19, 2000

(51) Int. Cl.$^7$ .................................................. G01V 1/28
(52) U.S. Cl. ........................................................ 702/17
(58) Field of Search ........................ 702/17, 14; 367/38, 367/41, 45, 189, 190

(56) References Cited

U.S. PATENT DOCUMENTS

| | | | |
|---|---|---|---|
| 4,890,264 A | 12/1989 | Crews et al. | 367/45 |
| 4,922,473 A | 5/1990 | Sallas et al. | 367/189 |
| 4,930,113 A | 5/1990 | Sallas | 367/190 |
| 5,703,833 A | 12/1997 | Allen | 367/46 |
| 5,721,710 A | 2/1998 | Sallas et al. | 367/41 |

FOREIGN PATENT DOCUMENTS

WO    WO 99/60423    5/1999

OTHER PUBLICATIONS

T. Bernhardt et al.; *Encoding Techniques for the Vibroseis System*, 1978, Geophysical Prospecting 26, pp. 184–193.

H. A. K. Edelmann et al.; *The encoded sweep technique for Vibroseis*, May 1982, Geophysics Vol. 47, No. 5, pp. 809–818 18 Figs.

*Primary Examiner*—Donald E. McElheny, Jr.
(74) *Attorney, Agent, or Firm*—Madan, Mossman & Sriram, P.C.

(57) ABSTRACT

A speaker system is used in conjunction with a surface seismic source that may be vibratory or impulsive. A speaker system having one or more speakers produces a sound signal that propagates primarily through the air and is received by microphones near the seismic spread. A transfer function between the microphones and the geophones in the seismic spread is determined from the speaker signal and used to filter out the airborne noise produced by the surface seismic source. The source may include or more vibrators that may be operated in a predetermined phase-relationship. The noise-attenuated signals may then be processed to separate out the contributions of the individual sources. Another embodiment of the invention uses accelerometer measurements of the reaction mass or the base plate of the vibrators or combination of the two measurements to invert the noise-attenuated signals.

40 Claims, 5 Drawing Sheets

DETERMINISTIC CANCELLATION OF AIR-COUPLED NOISE PRODUCED BY SURFACE SEIMIC SOURCES

BACKGROUND OF THE INVENTION

1. Field of the Invention

This application relates to noise reduction methods; specifically, it relates to methods and apparatus for reducing unwanted sound waves produced by seismic vibratory sources.

2. Background of the Art

Geophysical surveys to estimate the depth, shape, and composition of subterranean formations commonly use seismic vibrators to induce seismic waves, which may be detected using geophones. Seismic vibrators typically vibrate according to a controlled sweep of frequencies. In the commonly used "upsweep" methods, the vibrations start at a very low frequency and ending at a high frequency. In downsweeps, the vibrations start at a high frequency and end at a low frequency. Both compressional waves ("P" waves) or shear waves ("S" waves) may be used for the purpose.

Geophones, usually placed in an array or grid-like pattern on the surface of the earth or just beneath, are used to detect reflections of vibrations from rock strata. Measurement of the intensity and time delay of an arriving reflected wave at numerous locations allows the mapping of rock strata, and gives information about the thickness and composition of the layers.

Each of the rock layers underneath a seismic vibrator reflects the seismic waves induced at the surface according to its contrast in acoustic impedance. For example, an interface in which a low impedance layer lies above a high impedance layer will reflect a large proportion of the incident wave; therefore, the reflected wave will be of greater amplitude than an interface in which the layers on opposite sides of the interface have a small difference in impedance.

Geophones typically record the amplitude of detected vibrations at a given time for later analysis. When a vibratory source of energy is used, a correlation operator is commonly used to "compress" the record so that the arrival times of various reflection signals can be estimated. This "compression" of data is not necessary when an impulsive source of energy is used. Determination of the number of layers, and their depths are made through comparison of the amplitude of the wave with the time at which the reflection arrived after the initial induced vibration. The time-delay for a reflected wave to arrive at a geophone is an indication of the depth from which the wave is reflected.

Air-coupled waves are coherent noise trains produced by a surface seismic source, propagating at the speed of sound in air. Air waves may be entirely coupled with the air, or, in the case of low frequency (6–8 Hz) waves, may be partially coupled with the near surface if the phase velocity of the Rayleigh wave and the speed of sound in air are the same.

The latter has been described in Press and Ewing, "Ground Roll Coupling to Atmospheric Compressional Waves", Geophysics 16, pp. 416–30. Seismic vibrators usually operate above ground, with the vibrational energy transmitted into the earth via a baseplate resting on the ground. In field surveys, it is common to make use of a vibrator mounted on a truck. Since the majority of the vibrator is exposed to the air, including the upper surface of the baseplate, some of the vibrational energy during operation is transmitted through the air as sound waves.

These air-coupled sound waves are often of sufficient intensity to disrupt or impair measurements. The reflection seismic signals are small in magnitude and waves propagating through the air may cause slight vibrations of the geophone or of the ground itself, which are of relatively high amplitude, causing air-coupled waves to be recorded. Recordings of the air-coupled waves can be of sufficient intensity to mask underlying moderate depth reflection data. Because air wave noise can cause the ground to vibrate, burial or shielding of geophones fails to alleviate the problem.

Air wave noise is strongest at higher frequencies (i.e., 30 Hz and above). Prior art filtering techniques for removing Rayleigh waves (typically having a frequency less than 15 Hz.) have proven ineffective at such high frequencies because current geophone group spacing is too great, and creates a spatial aliasing problem. The effects of air wave noise may be suppressed through more closely spaced arrays of geophone elements; however, this results by an increase in the cost and complexity of conducting a survey.

U.S. Pat. No. 4,922,473 to Sallas (the '473 patent) discloses a passive absorption system for attenuation of air waves. In passive absorption, attenuation is achieved using a rigid, non-resonant structure which encloses the baseplate and is isolated from the vibrations of the baseplate and the ground. A cabinet provided with air bags is used as the enclosing structure. The problem with passive methods is that it is very difficult to build lightweight rigid attenuating structures that are well sealed.

U.S. Pat. No. 4,930,113 (the '113 patent) also to Sallas discloses an active cancellation method. In the '113 patent, base plate accelerometer signals are used to drive loudspeakers to produce a counterpart wave that is equal in amplitude and opposite in phase to the base plate motion. This method requires the generation of acoustic energy of a power level equal to that produced by the source. This requires a high power speaker and a large power source. In addition, the system must be well matched to produce real-time signals that are opposite in polarity to the base plate signal. This adds to the complexity of the system.

U.S. Pat. No. 4,890,264 to Crews et al discloses the use of microphones to record the airborne noise and using the recorded air noise signal for adaptively filtering the data recorded by the geophones. For successful airwave suppression, this method requires a microphone at each geophone location.

There is a need for a simple system with few components that is able to suppress airborne noise. Such a system should preferably have low power requirements. The present invention satisfies this need.

SUMMARY OF THE INVENTION

The present invention includes an acoustic energy source (speaker system) used in conjunction with the seismic source. As described here, the seismic source is a vibratory source, although the present invention is not limited to vibratory seismic sources. The speaker system produces a sound signal that propagates primarily through the air. In one embodiment of the invention, microphones are located near the seismic spread and arranged to be decoupled from ground vibrations. In another embodiment of the invention, the mechanical decoupling is not used: instead, an acceleration canceling microphone is used. A transfer function between the microphone and the geophones is determined from the speaker signal and used to filter out the airborne noise produced by the vibrator. In one embodiment of the invention, the speaker system signal is uncorrelated with the vibrator sweep. In another embodiment of the invention, the speaker signal may be correlated with the vibrator signal. In the alternate method, two vibrator sweeps are executed with opposite speaker polarities so that the sum and difference of the two records provides the speaker and the vibrator data respectively. In either case, the speaker system is made of two speakers located equidistant and on opposite sides of the baseplate so as to be able to simulate a speaker centered at the baseplate location. On vibrators with no drive shaft and a tall stilt structure, a speaker at the center of the baseplate is used. In an alternate embodiment of the invention, a single speaker is used and a duct is run to the center of the baseplate so that the speaker sound emerges at the center of the baseplate.

BRIEF DESCRIPTION OF THE DRAWINGS

For detailed understanding of the present invention, reference be made to the following detailed description of the preferred embodiment, taken together with the accompanying drawings, in which like elements have been given like numerals, wherein.

DETAILED DESCRIPTION OF THE PREFERRED EMBODIMENTS

Figure 1:
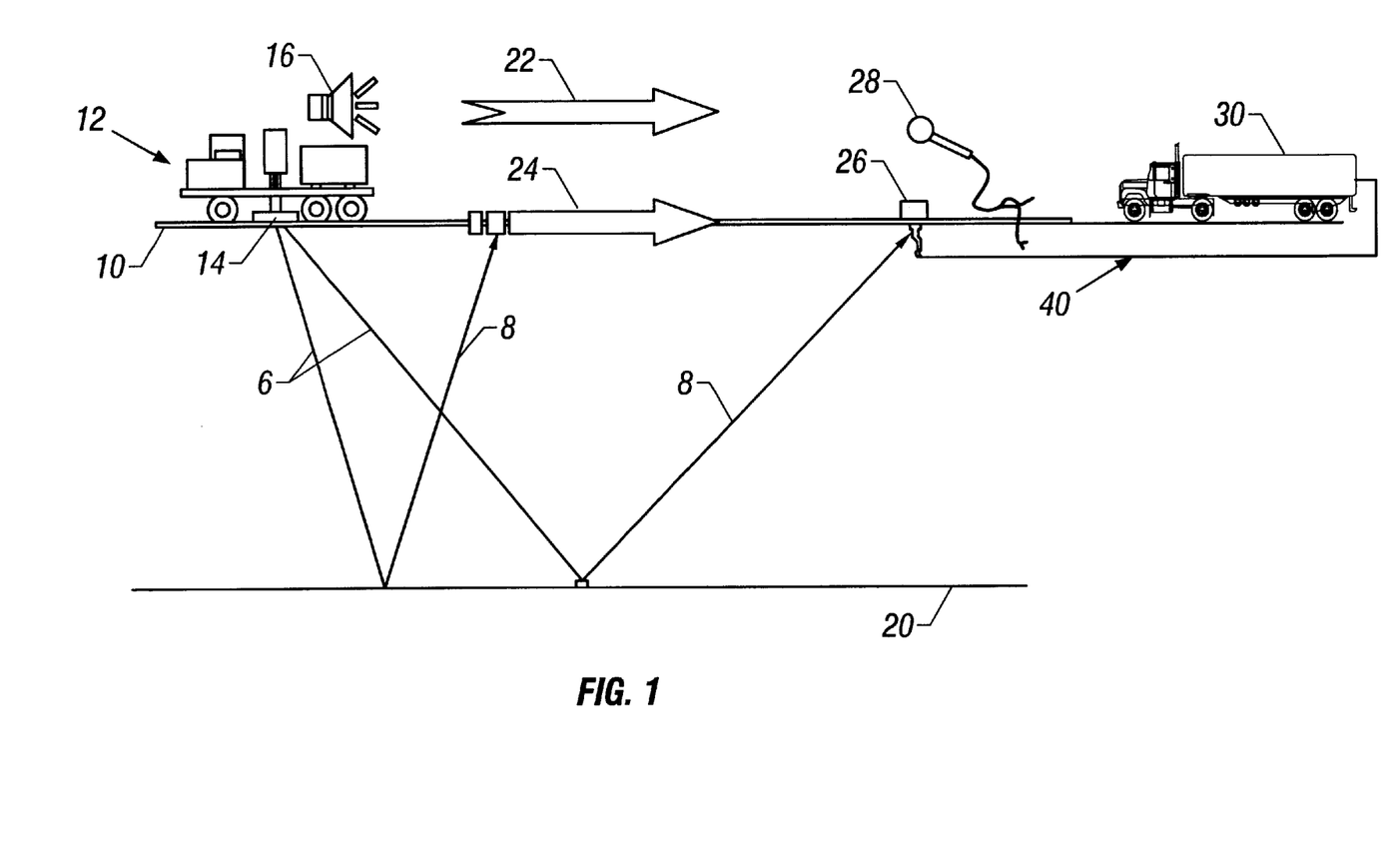
FIG. 1 shows a schematic illustration of a seismic data acquisition system incorporating the present invention.

Referring now to FIG. 1, a land seismic data acquisition system incorporating the present invention is schematically depicted. Shown on the surface of the earth 10 is an exemplary seismic source, in this instance a vibrator truck 12. The vibrator truck 12 has a baseplate 14 that engages the earth and vibratory motion of the base plate 14 generates seismic waves that propagate into the earth. The vibratory source may be a vertical vibrator or a horizontal vibrator. As would be known to those versed in the art, vibrators in which the baseplate motion is vertical are commonly used in P-wave prospecting whereas vibrators with horizontal baseplate motions are used for S-wave prospecting. The use of a vibratory source is for illustrative purposes only, and the present invention may also be used with other types of seismic sources, such as dynamite, a weight drop, an air gun, or the ARIS™ source of Atlantic Richfield Company.

Seismic waves, depicted by raypaths 6 propagate into the earth as a result of the baseplate motion and are reflected at an interface 20 as reflected rays (and associated waves) 8. These reflected seismic waves are detected by geophones, an exemplary geophone 26 being shown. The geophone converts the ground motion into electrical signals that are conveyed by a cable 40 or other suitable telemetry device (not shown) to a recording truck 30. Typically, the geophones are located at many spaced apart locations called receiver stations. At each receiver station, an array of geophones may be used to attenuate Rayleigh waves, commonly called "ground-roll", a motion of the free surface of the earth caused by the baseplate motion. The receiver arrays are designed to attenuate the Rayleigh waves.

In prior art seismic acquisition, the recorded signals are processed to produce information about the subsurface of the earth. Some preliminary processing is typically carried out in the recording truck. For example, when a vibratory source is used, the recorded signals are correlated with a reference signal indicative of the motion of the baseplate. Additionally, the correlated data from a plurality of sweeps of the vibratory source may be summed to increase the signal-to-noise ratio. This greatly reduces the amount of data that has to be subsequently processed. When a source such as ARIS is used, the preliminary processing may include compositing of individual records.

Also shown in FIG. 1 is airborne noise depicted by the arrow 24. This airborne noise is generated by the motion of the baseplate 14 and is typically large enough to produce motion of the geophone even when arrays of geophones are used for attenuating the Rayleigh waves. This is due to the fact that the airborne noise has a frequency that is commonly over 30 Hz with a peak between 50 and 80 Hz. Rayleigh waves, on the other hand, typically have frequencies less than 15 Hz and correspondingly longer wavelengths. Consequently, seismic arrays designed for attenuating Rayleigh waves are ineffective in attenuating airborne noise.

In the present invention, a speaker system 16 in the proximity of the truck 12 or on the truck itself produces a speaker signal indicated by the arrow 22. The present invention also includes a microphone (acoustic sensor) 28 in proximity to the receiver. In operation of the system, both the microphone 28 and the geophone 26 detect the airborne noise 24 and the speaker signal 22. A single microphone is shown for illustrative purposes although in practice, a plurality of microphones at different locations are used. Each microphone may be used for processing the geophone data from several groups of geophones extending over several hundred feet.

The microphone 28 should preferably be low noise and have a good low frequency response. As would be known to those versed in the art, conventional microphones used in sound systems are relatively insensitive to frequencies below 50–100 Hz and are not suitable for the present invention. In a preferred embodiment of the invention, hydrophones are used as microphones. U.S. Pat. Nos. 5,363, 342 to Layton et al, and 4,998,226 to Henning et al. show examples of fiber-optic hydrophones that are insensitive to acceleration. U.S. Pat. No. 5,361,240 to Pearce shows an example of a piezoelectric, acceleration canceling hydrophone. These or any other suitable hydrophone may be used for the purpose. The speaker system includes a signal generator and amplifier and is preferably capable of producing 50–200 watts of acoustic energy over a frequency band of 10–250 Hz. In one embodiment of the invention, a random sequence generator (not shown), preferably on a printed circuit board, is plugged into an unused slot in the vibrator electronics. The output of this card feeds an audio amplifier whose output drives the speaker system that is mounted on the truck. Another random sequence generator is required on the recording truck.

Vibrator airborne noise cancellation is achieved in the present invention by measuring the airborne noise with a microphone and determining the transfer function between the microphone and a geophone. In order to determine the transfer function, an additional acoustic wave is generated on the vibrator using the onboard speaker system. The vibrator and speaker data are gathered simultaneously.

In one embodiment of the invention, the seismic source consists of a single vibrator and the speaker signal is designed to be uncorrelated with the vibrator sweep. Consequently, the cross-correlation with the vibrator sweep that is part of normal processing of vibrator data will remove the speaker signal when the signals recorded by either the geophone or the microphone are cross-correlated with the vibrator sweep. In a preferred embodiment of the invention, the speaker signal may be correlated with the vibrator sweep. In this embodiment of the invention, the method of speaker differencing is deployed wherein two vibrator sweeps are executed with opposite speaker polarities: the sum and difference of two records (microphone or geophone) then gives the vibrator and speaker data respectively. The method of speaker differencing is preferred because the separability of the vibrator and speaker data is enhanced in the presence of harmonic distortion that is commonly present in the vibrator. As would be known to those versed in the art, the speaker and vibrator data may be separated by other methods.

The transfer function that is determined from the speaker signal characterizes the transmission path of the vibrator airborne noise only if both the vibrator airborne noise and the speaker signal are generated at the same location. This is difficult to achieve in practice where the stilt structure of the vibrator occupies the center region of the baseplate. Accordingly, the speaker system comprises two speakers located equidistant from the center of the baseplate, at the same height, and on opposite sides of the baseplate. This defines a "virtual" speaker located at the center of the baseplate.

In the frequency domain, the geophone and microphone records are given by the equations:

$$G(f)=V(f)h_e(f)+V(f)h_{vg}(f)+S(f)h_{sg}(f)+N_g(f) \quad (1)$$

and $$M(f)=V(f)h_{vm}(f)+S(f)h_{sm}(f)+N_m(f) \quad (2)$$

where G(f) and M(f) are the geophone and microphone records, V(f) is the vibrator signal, S(f) is the speaker signal, $h_e$ is the earth transfer function, $h_{vg}$ and $h_{vm}$ are transfer functions between the vibrator and the geophone and the microphone respectively. Similarly, $h_{sg}$ and $h_{sm}$ are transfer functions between the speaker and the geophone and microphone respectively. The noises on the geophone and the microphone are denoted by $N_g$ and $N_m$ respectively. Note that in eq. (2), there is no term relating the microphone signal to the earth response: this is due to the fact that the microphone is substantially decoupled from ground vibrations.

Figure 2:
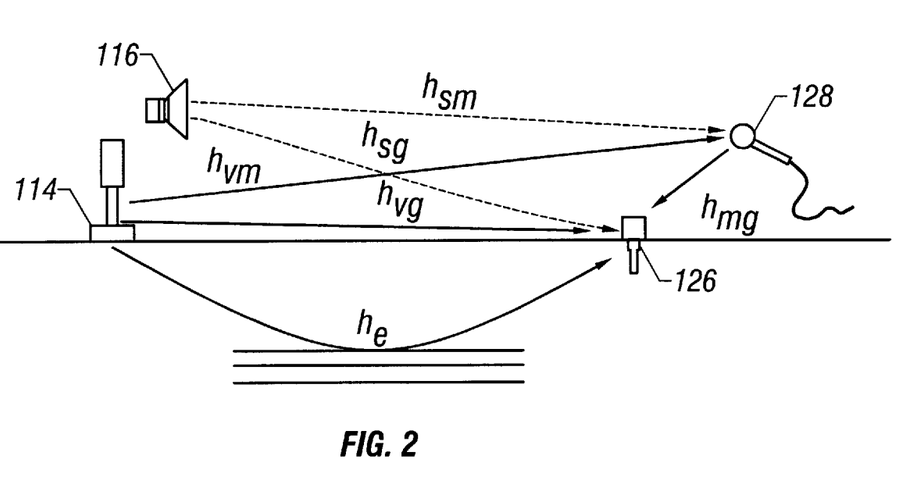
FIG. 2 shows the transfer functions associated with the various sources and receivers for the system of FIG. 1.
Figure 3:
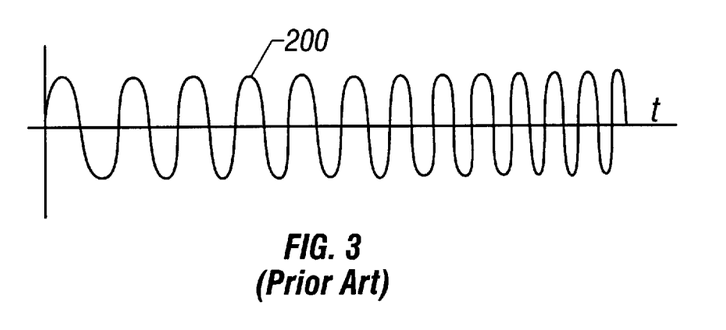
FIG. 3 (PRIOR ART) is an example of an upsweep vibratory signal.

The transmission paths corresponding to the various terms of eqs. (1) and (2) are indicated in FIG. 2. The vibrator baseplate is indicated at 114, the speaker system at 116, the geophone at 126 and the microphone at 128. What is desired in seismic exploration is the earth transfer function $h_e$ representing the response of the subsurface of the earth to the excitation provided by the vibrator 114 as detected by the geophone 126. The terms $h_{vg}$ and $h_{vm}$ are the transfer functions relating the geophone and microphone response to the vibrator. The terms $h_{sg}$ and $h_{sm}$ are the transfer functions relating the geophone and microphone response to the speaker system. As noted above, a vibrator puts out a swept frequency signal that could be an upsweep or a downsweep. An example of a prior art upsweep signal 200 is shown in FIG. 3.

If the speaker signal is designed to be uncorrelated with the vibrator sweep (and the noise terms $N_g$ and $N_m$), then cross-correlation of G(f) and M(f) with the virtual speaker signal gives $$G(f)S^*(f)=S(f)S^*(f)h_{sg}(f)$$

and $$M(f)S^*(f)=S(f)S^*(f)h_{sm}(f) \quad (3)$$

where * denotes complex conjugate. The noise terms drop out when a short time window centered on the main lobe of the cross-correlations GS and MS is applied. Such a windowing method would be known to those versed in the art and is not described here. Obtaining eq. (3) requires a knowledge of the virtual speaker output. This is obtained by the following sub-process.

The input to the speakers is time-delayed a specified amount one speaker with respect to the other to facilitate the separation of their contributions. This is done in the following manner:

The speaker signal arrivals at the microphone are isolated into windows and the delayed arrival is advanced by the specified time delay to align the arrivals. The arrival times for the two signals are determined using a threshold detector. The two signals are then time-shifted to the average of the two arrival times and then the geometric average of the two signals is obtained in the frequency domain. The latter step of geometric averaging requires a Fourier transform with phase unwrapping, averaging of the phases of the two signals, determining the geometric mean of the two amplitudes, and inverse transforming back to the time domain. This procedure is repeated for the speaker signals at the geophone.

The specified time delay is typically 300 ms. When multiple vibrators are used in seismic data acquisition, the number of speakers will be twice the number of vibrators and windowing has to be performed for each of the speakers. An upper limit to the individual delay time is set by the constraint that the total delay for all the speakers must not exceed the "listen" time in the seismic recording: otherwise, the acquisition is slowed down.

An estimate of $h_{mg}$, the transfer function between the microphone and the geophone may then be determined as $$h_{mg}(f) = \frac{G(f)S^*(f)}{M(f)S^*(f)} = \frac{h_{sg}(f)}{h_{sm}(f)} \quad (4)$$

Because the speaker signal is generated at the same position as the vibrator airborne noise, the same transfer function holds for the vibrator airwave transmission path between the microphone and the geophone $$h_{mg}(f) = \frac{h_{vg}(f)}{h_{vm}(f)}. \quad (5)$$

The vertical distance between the baseplate and the "virtual" speaker is typically 1 m. or so. This is extremely small when considering the far field responses of the microphone and the geophone. With the transfer function $h_{mg}$ given by eqs. (4) and (5), the geophone record given by eq. (1) may be written as $$G=Vh_e+(Vh_{vm}+Sh_{sm})h_{mg}+N_g \quad (6).$$

Substituting from Eq. (2), this gives $$G=Vh_e+(M-N_m)h_{mg}+N_g \quad (7)$$

This gives, for the desired seismic signal $$Vh_e=G-Mn_{mg}+\text{noise} \quad (8)$$

Substituting from eq. (4) and crosscorrelating with the pilot sweep, the fundamental equation used in this invention becomes $$GV' = GV - MV \frac{GS}{MS} + noise \quad (9)$$

where $GV'=V^2 h_e$ is the cleaned up geophone record. The second term on the right hand side of eq. (9) may be considered a correction signal (in the Fourier transform domain). Note that for convenience, the dependency on frequency has been omitted in eqs. (6)–(9) and also in subsequent equations.

Figure 4:
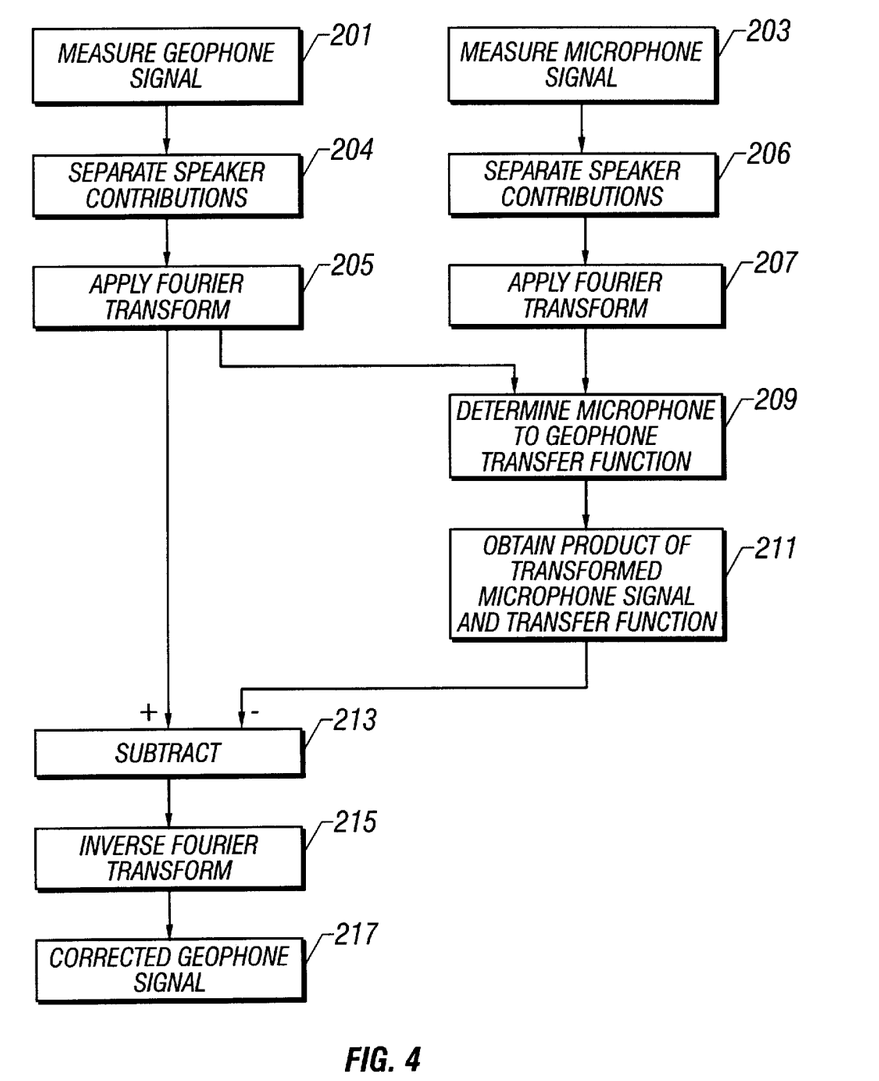
FIG. 4 is a flow chart illustrating an embodiment of the invention using a single vibratory source.

The implementation of eq. (9) is given by the flow chart in FIG. 4. The geophone signal 201 and the microphone signal 203 for the vibrator source are measured, the speaker signals at the geophone and the microphone are separated 204, 206 and Fourier transformed 205, 207. The transfer function from the microphone to the geophone is determined 209. The transformed microphone signal 203 is multiplied with the determined transfer function 211 and subtracted 213 from the transformed geophone record and inverse transformed 215 to give the corrected geophone signal 217 with the airblast attenuated. This corrected signal may then be processed using known steps used in the processing of vibratory seismic data.

Other embodiments of the invention use multiple vibratory sources. For exemplary purposes, only two vibratory sources are discussed. Those versed in the art would be able to determine from the examples given below embodiments of the invention using multiple vibratory sources.

First, the case of two vibratory sources executing the same sweep is discussed. When two vibrators execute the same sweep simultaneously, only one record will be available containing the airblasts of the two vibrators. In terms of cancellation of airwaves, this is an underdetermined problem that requires for its solution at least as many microphones as there are vibrators. Again, it is assumed that the speaker signals from the different vibrators are separable either by encoding or by time separation.

Eq. (9) is valid for each vibrator. Accordingly, the cleaned up geophone record for the two vibrator case is the sum of two equations of the form of eq. (9), each representing the contribution of one of the vibrators.

$$GV' = GV_1' + GV_2' \quad (10)$$

$$= GV_1 + GV_2 - \left(GS_1 \frac{MV_1}{MS_1} - GS_2 \frac{MV_2}{MS_2}\right) + noise$$

In practice, the terms $GV_1$, $GV_2$, $MV_1$, and $MV_2$ are not accessible because the vibrator sweeps are not separable. In other words, if G or M is crosscorrelated with either $V_1$ or $V_2$, the result will include contributions from both vibrators. Eq. (10) may be rewritten as $$GV'=GV-(GS_1 m+GS_2 n)+noise \quad (11)$$

where m and n are complex quantities that are determined using two microphones $M_1$ and $M_2$ such that for each frequency $$M_1 S_1 m + M_1 S_2 n = M_1 V$$

$$M_2 S_1 m + M_2 S_2 n = M_2 V \quad (12)$$

In eq.(12) the separable speaker signals have been used to separate the vibrator contributions on the microphones. The solution to eq. (12) is $$\begin{bmatrix} m \\ n \end{bmatrix} = \begin{bmatrix} M_1 S_1 & M_1 S_2 \\ M_2 S_1 & M_2 S_2 \end{bmatrix}^{-1} \begin{bmatrix} M_1 V \\ M_2 V \end{bmatrix} \quad (13)$$

which is of the form $$[X]=[MS]^{-1}[MV] \quad (14)$$

Eq. 13 is solved to give a value of m and n for each frequency. A better estimate of m and n may be obtained by using additional microphones. This leads to more effective noise reduction. For the overdetermined case, [MS] is no longer a square matrix and a solution is of the form $$[X]=[MS^T MS]^{-1}[MS^T][MV] \quad (15)$$

In an optional embodiment of the invention, a weighting matrix [W] is used in the generalized inverse to give a solution of the form $$[X]=[MS^T WMS]^{-1}[MS^T][W][MV] \quad (16).$$

The weighting factors may be selected as being inversely proportional to the noise variance or the distance between the microphone and geophone of interest.

It is not uncommon in practice for a signal on one channel of a recording system to be much stronger than signals on other channels. This could be due to different sensitivity of the microphone, different channel gains, or differences in proximity of microphones to the vibrators. An alternate embodiment of the invention solves a normalized form of eq. (13)

$$\begin{bmatrix} m \\ n \end{bmatrix} = \begin{bmatrix} \frac{M_1 S_1}{M_1 V} & \frac{M_1 S_2}{M_1 V} \\ \frac{M_2 S_1}{M_2 V} & \frac{M_2 S_2}{M_2 V} \end{bmatrix}^{-1} \begin{bmatrix} 1 \\ 1 \end{bmatrix} \quad (17)$$

and an equivalent overdetermined form similar to eq. (16).

U.S. Pat. No. 4,715,020 to Landrum, the contents of which are fully incorporated herein by reference, discloses a method of separating signals from multiple vibratory sources using phase shifting of the signals on different sweeps. A plurality of vibratory sources transmit signals into the earth. After the first transmission is completed, additional transmissions are performed in which the phases of the signals transmitted by the various vibratory sources are selectively shifted. The number of phase relationships is equal to the number of vibratory sources. The detected signal resulting from each simultaneous transmission is correlated separately with the signal transmitted by each vibratory source during the transmission.

In order to separate the contributions of two vibrators, designated herein as vibrator A and vibrator B, at least two sweeps are required. During the first sweep, vibrator A uses a sweep signal $A_1$ and a speaker signal $S_1$ while vibrator B uses sweep $B_1$ and speaker signal $T_1$. During the second sweep, vibrator A uses a sweep signal $A_2$ and a speaker signal $S_2$ while vibrator B uses sweep $B_2$ and speaker signal $T_2$. The geophone records $G_1$ and $G_2$ for the two sweeps are $$G_1 = A_1 h_{ea} + B_1 h_{eb} + A_1 h_{vga} + B_1 h_{vgb} + S_1 h_{sg} + T_1 h_{tg} + noise$$

$$G_2 = A_2 h_{ea} + B_2 h_{eb} + A_2 h_{vga} + B_2 h_{vgb} + S_2 h_{sg} + T_2 h_{tg} + noise \quad (17)$$

The corresponding microphone records $M_1$ and $M_2$ for the two sweeps are $$M_1 = A_1 h_{vma} + B_1 h_{vmb} + S_1 h_{sm} + T_1 h_{tm} + \text{noise}$$

$$M_2 = A_2 h_{vma} + B_2 h_{vmb} + S_2 h_{sm} + T_2 h_{tm} + \text{noise} \quad (18)$$

where $h_{ea}$ and $h_{eb}$ are the earth transfer functions from vibrator positions a and b. All the other terms in eqs. (17) and (18) characterize the transmission paths between the sources (vibrator positions a or b and speaker positions s or t) and the receivers (microphone position m or geophone position g). In an optional embodiment of the invention wherein phase encoding of the vibrator signals is used, the two speaker signals may be the same.

Assuming that the speaker signals on each truck for each sweep are separable by encoding or by time delay, the following transfer functions are determinable:

$$h_{sg} = G_1 S_1 / S_1^2 = G_2 S_2 / S_2^2$$

$$h_{sm} = M_1 S_1 / S_1^2 = M_2 S_2 / S_2^2$$

$$h_{tg} = G_1 T_1 / T_1^2 = G_2 T_2 / T_2^2$$

$$h_{tm} = M_1 T_1 / T_1^2 = M_2 T_2 / T_2^2 \quad (19)$$

These determined transfer functions are then convolved with the appropriate speaker drive signals and then subtracted from eqs. (17) and (18) to provide signals that have the speaker signals removed.

$$G_1' = A_1 h_{ea} + B_1 h_{eb} + A_1 h_{vga} + B_1 h_{vgb} + \text{noise}$$

$$G_2' = A_2 h_{ea} + B_2 h_{eb} + A_2 h_{vga} + B_2 h_{vgb} + \text{noise} \quad (20)$$

and $$M_1' = A_1 h_{vma} + B_1 h_{vmb} + \text{noise}$$

$$M_2' = A_2 h_{vma} + B_2 h_{vmb} + \text{noise} \quad (21)$$

Eqs. (21) can be used to provide estimates of the form $$\begin{bmatrix} h_{vma} \\ h_{vmb} \end{bmatrix} = \begin{bmatrix} A_1 & B_1 \\ A_2 & B_2 \end{bmatrix}^{-1} \begin{bmatrix} M_1' \\ M_2' \end{bmatrix} \quad (22)$$

We also know that $$h_{vga} = h_{vma} h_{mga} \text{ and } h_{vgb} = h_{vmb} h_{mgb} \quad (23)$$

with $h_{mga}$ and $h_{mgb}$ being the transfer functions of the transmission path between the microphone and the geophone for vibrator positions a and b. According to eqs. (5) and (4), this may be expressed as $h_{sg}/h_{sm}$ and $h_{tg}/h_{tm}$. The desired component of the geophone signals may then be expressed as $$A_1 h_{ea} + B_1 h_{eb} = G_1' - (A_1 h_{vma} h_{sg}/h_{sm} + B_1 h_{vmb} h_{tg}/h_{tm}) + \text{noise}$$

$$A_2 h_{ea} + B_2 h_{eb} = G_2' - (A_2 h_{vma} h_{sg}/h_{sm} + B_2 h_{vmb} h_{tg}/h_{tm}) + \text{noise} \quad (24)$$

The cleaned up signals from eq. (24) can then go through the usual steps of phase rotation to separate the source contributions as disclosed in the Landrum patent, giving source-separated, noise attenuated geophone signals.

Those versed in the art would recognize that a variety of encoding schemes other than the phase-rotation of Landrum may be used for recovering signals from a plurality of vibrators: all that is required is that the vibrator sweeps be uncorrelated with each other. In one embodiment of the invention, each vibrator uses a different pseudo-random sequence. In another embodiment of the invention, a single pseudo-random sequence is used with each vibrator using a "time-rotated" version of the same pseudo-random sequence. In yet another embodiment of the invention, one vibrator uses an upsweep and a second vibrator uses a downsweep. In still another embodiment of the invention, E-codes that allow for multiple-source-point recording with spectral control of the signal are used. Such coding schemes are discussed in Bernhardt and Peacock (1978); Edelmann and Werner (1982); and Womack et al. (1988).

Another embodiment of the invention uses methods disclosed in U.S. Pat. No. 5,708,833 to Allen (the '833 patent) or U.S. Pat. No. 5,721,710 to Sallas (the '710 patent), the contents of both applications being incorporated herein by reference. The '833 patent and the '710 patent teach methods of using the accelerometer measurements along with geophone measurements to obtain high fidelity reflection seismograms that do not require the correlation process used in normal processing of vibratory seismic data: instead, an inversion technique uses the accelerometer measurements to obtain processed seismic data. In the context of the present invention, accelerometers are used to measure the motion of the reaction mass and the baseplates of each of the plurality of vibrators and the teachings of the '833 patent or the '710 patent are used to invert the cleaned up seismic signals from eq. (24) giving inverted, noise-attenuated, geophone signals.

Figure 5A:
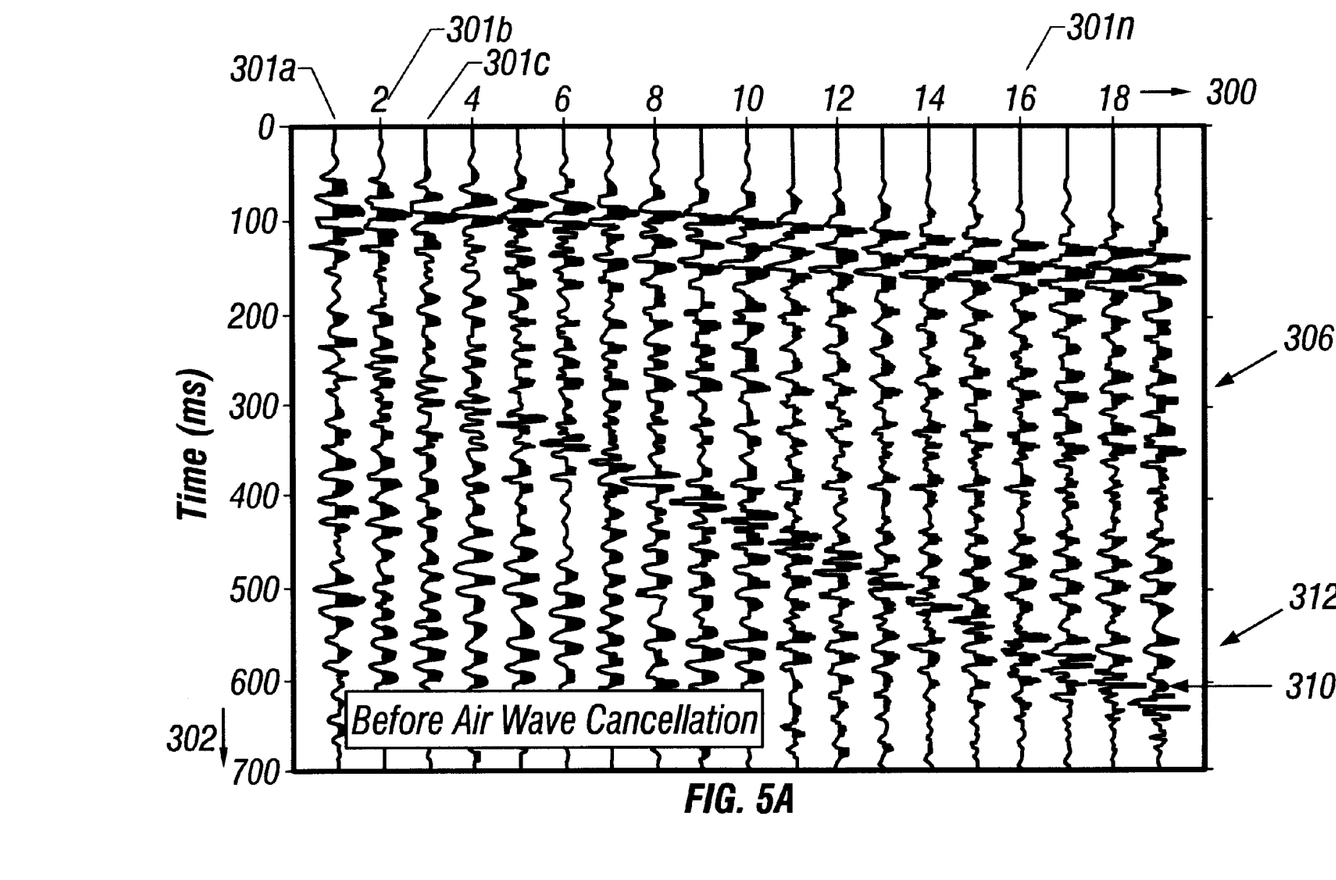
FIGS. 5A and 5B show an example of the use of the invention in attenuating airborne noise.
Figure 5B:
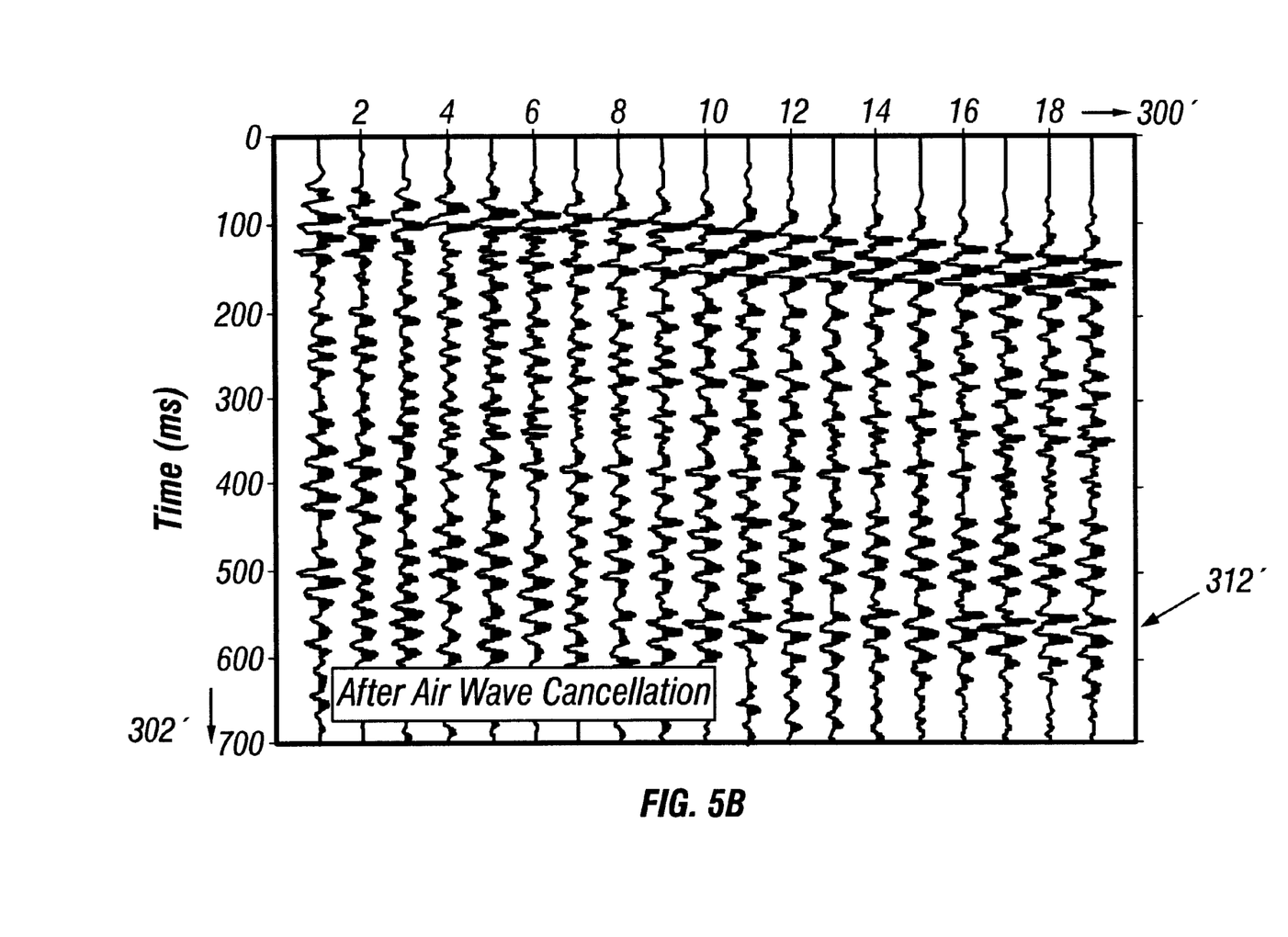

FIGS. 5a and 5b show an example of the result of using the present invention. Shown in FIG. 5a is a partially processed seismic section using prior art methods of correlating seismic signals recorded at a plurality of receiver locations. The abscissa 300 is the spatial position of the receiver locations and the ordinate 302 is time. Data at the plurality of locations are graphically depicted by the seismic traces 301a, 301b, 301c . . . 301n. The data were recorded using a vibratory source and the prior art processing that was used to obtain the seismic section of FIG. 5a included a cross-correlation with the vibrator reference signal to reduce the amount of data.

The seismic section shows a number of seismic reflections such as 306 and 312 from subterranean reflectors. Also visible in FIG. 5a is the air blast 310 from the surface vibratory source. The result of using the present invention is shown in Fig. 5b that is similar to FIG. 5a, the main difference being the attenuation of the air blast from the surface source.

The above discussion has used a speaker system and the signal therefrom for determining the transfer function between the microphone and the geophone. A speaker system has been used purely for illustrative purposes and any acoustic source that generates a signal that is primarily airborne and is independent of or can be separated from the surface seismic source could be used for the purpose of determining the transfer function from the microphone to the geophone and attenuating the airborne noise from the surface seismic source. For example, the discharge of a shotgun shell could be used; alternatively, an airgun discharging into the air could be used as the acoustic source. These are fired immediately after the vibrator sweep in a different record. The analysis of the data is substantially the same for these alternate surface sources.

Prior art methods have also made use of geophones buried in shallow holes for obtaining better coupling of the geophones with the earth and detecting seismic waves therein. Due to the proximity of such buried geophones to the surface, they are still responsive to the airborne noise. The method of the present invention may be used with such shallow geophones near the surface of the earth.

Sensors other than geophones have been used in seismic exploration on land. For example, Berni (U.S. Pat. Nos.

5,289,434, 5,317,383 and 5,327,216) teaches the use of laser Doppler interferometry (LDI) wherein reflectors are positioned on the surface of the earth and illuminated by laser signals and Doppler interferometry is used to determine motion of the reflectors, such motion being indicative of ground motion. These reflectors are typically much lighter than geophones, and would therefor be even more sensitive to the airborne noise than conventional geophones on the surface of the earth. The method of the present invention may be used with LDI prospecting.

Airborne noise may also be a problem in exploration in a transition zone between land and shallow water. In transition zones, the seismic detectors may be hydrophones in a water layer or geophones on marshy land. The seismic sources may be land seismic sources or, if the water is deep enough (more than 1 meter), an airgun may be used. The method of the present invention may be used with seismic exploration in transition zones using appropriate detectors (geophone or LDI reflector on land, hydrophone in water) and appropriate sources (vibrator or ARIS or Land air gun on land, marine air gun in water depths greater than 1 meter.)

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of seismic exploration comprising:
   (a) exciting at least one seismic source having a first signal at a source location on the surface of the earth thereby generating seismic waves traveling into the earth and reflecting from formations therein;
   (b) operating a speaker system associated with and in proximity to the at least one seismic source, said acoustic source having a second signal for generating acoustic waves propagating above the surface of the earth;
   (c) placing at least one seismic detector at at least one receiver location on or in proximity to the surface of the earth for receiving airborne noise generated by the at lease one seismic source, said reflections of seismic waves, and said acoustic waves, and generating a third signal in response thereto, said at least one receiver location spaced apart from said at least one source location;
   (d) placing at least one acoustic sensor in proximity to said at least one receiver location for receiving said acoustic waves and said airborne noise, and producing a fourth signal in response thereto; and
   (e) processing said third and fourth signals to provide a processed signal substantially comprising reflections of said seismic waves.

2. The method of claim 1 wherein said at least one seismic source is selected from the group consisting of (i) a vibratory source, (ii) dynamite, (iii) a land air gun, (iv) a dropping weight, and, (v) an ARIS™ source.

3. The method of claim 1 wherein exciting said at least one seismic source further comprises operating a vibratory source, and said first signal is selected from the group consisting of (i) a swept frequency signal, and, (ii) a pseudo-random signal.

4. The method of claim 1 further comprising operating said speaker system simultaneously with exciting said at least one seismic source.

5. The method of claim 1 wherein operating said speaker system further comprises using a pseudo-random sequence for generating said second signal.

6. The method of claim 1 wherein said second signal is uncorrelated with said first signal.

7. The method of claim 1 wherein steps (a) and (b) of claim 1 are performed at a first time and at a second time, and wherein the first signal is substantially the same at the first and second times, and the second signal at the second time has a polarity opposite to a polarity of the second signal at the first time.

8. The method of claim 3 wherein said speaker system including a first speaker and a second speaker disposed on opposite sides of a base plate of said vibratory source, the method further comprising deriving a virtual speaker signal representing an estimate of an acoustic signal that would be produced by a speaker located at the source location.

9. The method of claim 1 wherein processing said third and fourth signals further comprises determining a transfer function relating a response of the at least one acoustic sensor to a response of the at least one seismic detector.

10. The method of claim 8 wherein processing said third and fourth signals further comprises determining a transfer function relating a response of the at least one acoustic sensor to a response of the at least one seismic detector.

11. The method of claim 10 wherein processing said third and fourth signals further comprises:
    (i) transforming the third and fourth signals to a transform domain giving a transformed third and fourth signal;
    (ii) multiplying the transformed fourth signal by said transfer function giving a transformed correction signal;
    (iii) subtracting transformed correction signal from the transformed third signal to give a transformed, noise-attenuated, geophone signal; and
    (iv) inverse transforming the transformed, noise-attenuated, geophone signal back to time.

12. The method of claim 10 wherein processing said third and fourth signals further comprises:
    (i) transforming the third and fourth signals to a transform domain giving a transformed third and fourth signal;
    (ii) multiplying the transformed fourth signal by said transfer function giving a transformed correction signal;
    (iii) inverse transforming the transformed correction signal to give an inverse-transformed correction signal;
    (iv) subtracting inverse-transformed correction signal from the third signal.

13. The method of claim 11 wherein the transform domain is the Fourier domain.

14. The method of claim 1 wherein the at least one seismic source comprises a first plurality of vibratory sources, and wherein exciting the at least one seismic source further comprises exciting the first plurality of vibratory sources a plurality of times greater than or equal to said first plurality, said first plurality of vibratory sources having a predetermined phase relationship relative to each other.

15. The method of claim 14 wherein processing the third and fourth signals further comprises separating the contributions from each of the first plurality of vibratory sources and speaker systems.

16. The method of claim 15 wherein processing the third and fourth signals further comprises determining a plurality of transfer functions relating the second plurality of microphones to a second plurality of associated geophones.

17. The method of claim 16 further comprising using the determined plurality of transfer functions to obtain a plurality of noise-attenuated geophone signals.

18. The method of claim 17 further comprising processing the plurality of noise-attenuated geophone signals using said predetermined phase relationships to obtain a plurality of source-separated, noise-attenuated geophone signals.

19. The method of claim 17 further comprising
   (i) measuring signals indicative of motion of the baseplate of said plurality of vibratory sources, and
   (ii) inverting the plurality of noise-attenuated geophone signals using said measured baseplate motion signals to give a plurality of inverted, noise-attenuated geophone signals.

20. The method of claim 19 wherein measuring signals indicative of motion of the baseplate further comprises using a sensor selected from the group consisting of:
   (i) an accelerometer, (ii) a pressure sensor, and, (iii) a geophone.

21. The method of claim 1 wherein the at least one seismic source comprises a first plurality of vibratory sources, and wherein exciting the at least one seismic source further comprises exciting the first plurality of vibratory sources a plurality of times greater than or equal to said first plurality, said first plurality of vibratory sources having signals that are uncorrelated with each other.

22. The method of claim 21 wherein said signals of the first plurality of vibratory sources are selected from the group consisting of: (i) different pseudo-random sequences, (ii) time-rotated versions of a pseudo-random sequence, (iii) an upsweep and a downsweep, and, (iv) E-coded signals.

23. The method of claim 1 wherein said at least one acoustic sensor comprises a microphone, the method further comprising isolating the at least one microphone from ground vibrations.

24. The method of claim 1 wherein the at least one acoustic sensor comprises an acceleration canceling microphone.

25. The method of claim 1 wherein said at least one seismic detector further comprises a plurality of seismic detectors, and said proximity comprises distances less than 400 feet.

26. The method of claim 1 wherein the at least one seismic detector is selected from the group consisting of: (i) a geophone, and, (ii) a reflector that is part of a Laser Doppler Interferometric system.

27. A seismic data acquisition system comprising:
   (a) at least one seismic source having a first signal at a source location on the surface of the earth said at least one seismic source generating seismic waves traveling into the earth and reflecting from formations therein;
   (b) a speaker system associated with and in proximity to the at least one seismic source, said speaker system having a second signal for generating acoustic waves propagating above the surface of the earth;
   (c) at least one seismic detector at at least one receiver location on the surface of the earth for receiving airborne noise generated by the at least one seismic source, said reflections of seismic waves, and said acoustic waves, and generating a third signal in response thereto, said at least one receiver location spaced apart from said at least one source location;
   (d) at least one acoustic sensor in proximity to said at least one receiver location for receiving said acoustic waves and said airborne noise, and producing a fourth signal in response thereto; and
   (e) a processor for processing said third and fourth signals to provide a processed signal substantially comprising reflections of said seismic waves.

28. The seismic data acquisition system of claim 27 wherein said at least one seismic source is selected from the group consisting of (i) a vibratory source, (ii) dynamite, (iii) a land air gun, (iv) a dropping weight, and, (v) an ARIS™ source.

29. The seismic data acquisition system of claim 27 wherein said at least one seismic source further comprises a vibratory source generating a swept frequency signal.

30. The seismic data acquisition system of claim 27 wherein said speaker system operates simultaneously with said at least one seismic source.

31. The seismic data acquisition system of claim 27 wherein said speaker system uses a pseudo-random sequence for generating said second signal.

32. The seismic data acquisition system of claim 27 wherein said speaker system comprises a first speaker and a second speaker disposed on opposite sides of a base plate of said vibratory source.

33. The seismic data acquisition system of claim 27 wherein said processor further determines a transfer function relating a response of the microphone to a response of the geophone and uses said determined transfer function and the third and fourth signals to obtain a noise attenuated geophone signal.

34. The seismic data acquisition system of claim 27 wherein the at least one seismic source comprises a first plurality of vibratory sources, the at least one microphone comprises a second plurality of microphones and wherein said second plurality is equal to or greater than said first plurality, said first plurality of vibratory sources operable in a predetermined phase relationship to each other.

35. The seismic data acquisition system of claim 29 further comprising accelerometers for measuring motion of a reaction mass and a baseplate of the at least one vibratory source.

36. A method of seismic exploration comprising:
   (a) exciting at least one seismic source having a first signal at a source location on or near the surface of the earth or a body of water thereby generating seismic waves traveling into the earth and reflecting from formations therein;
   (b) operating an acoustic source associated with and in proximity to the at least one seismic source, said acoustic source having a second signal for generating acoustic waves propagating above the surface of the earth;
   (c) placing at least one seismic detector at at least one receiver location on the surface of the earth for receiving airborne noise generated by the at lease one seismic source, said reflections of seismic waves, and said acoustic waves, and generating a third signal in response thereto, said at least one receiver location spaced apart from said at least one source location;
   (d) placing at least acoustic sensor in proximity to said at least one receiver location for receiving said acoustic waves and said airborne noise, and producing a fourth signal in response thereto; and
   (e) processing said third and fourth signals to provide a processed signal substantially comprising reflections of said seismic waves.

37. The method of claim 36 wherein processing said third and fourth signals further comprises determining a transfer function relating a response of the at least one microphone to a response of the at least one seismic detector.

38. The method of claim 37 wherein said acoustic source is selected from the group consisting of: (i) a speaker system, (ii) an airgun, and, (iii) a shotgun.

39. The method of claim 37 wherein said at least one seismic source is selected from the group consisting of (i) a vibratory source, (ii) dynamite, (iii) a land air gun, (iv) a dropping weight, (v) an ARIS™ source, and, (vi) a marine air gun.

40. The method of claim 37 wherein said at least one seismic detector is selected from the group consisting of: (i) a geophone, (ii) a hydrophone, and, (iii) a reflector that is part of a Laser Doppler Interferometric system.

* * * * *